(12) United States Patent
Boisjoli

(10) Patent No.: US 8,672,729 B2
(45) Date of Patent: Mar. 18, 2014

(54) WHEEL POLISHING ROTARY STAND

(76) Inventor: Stephane Boisjoli, Drummondville (CA)

(*) Notice: Subject to any disclaimer, the term of this patent is extended or adjusted under 35 U.S.C. 154(b) by 483 days.

(21) Appl. No.: 12/799,642

(22) Filed: Apr. 29, 2010

(65) Prior Publication Data

US 2010/0304647 A1    Dec. 2, 2010

Related U.S. Application Data

(60) Provisional application No. 61/213,298, filed on May 27, 2009.

(51) Int. Cl.
*B24B 41/02* (2006.01)

(52) U.S. Cl.
USPC ............ 451/11; 269/17; 29/281.1; 254/2 R

(58) Field of Classification Search
USPC ........ 451/379, 385, 398, 49; 15/53.1; 157/14, 157/20; 254/2 R; 74/606 R; 29/281.1
See application file for complete search history.

(56) References Cited

U.S. PATENT DOCUMENTS

| | | | |
|---|---|---|---|
| 2,728,236 A | | 12/1955 | Hemmeter |
| 3,075,574 A | * | 1/1963 | Groves et al. ............... 157/13 |
| 3,864,990 A | * | 2/1975 | Lacoste ................. 74/606 R |
| 4,478,593 A | * | 10/1984 | Brown ..................... 464/182 |
| RE31,958 E | * | 7/1985 | Hilt ........................ 425/383 |
| 4,667,539 A | * | 5/1987 | Fickelscher ............... 475/176 |
| 4,723,377 A | | 2/1988 | Watts |
| 5,339,707 A | * | 8/1994 | Arbus .................... 74/606 R |
| 6,654,998 B1 | * | 12/2003 | Berdan et al. ............... 29/464 |
| 6,957,999 B1 | | 10/2005 | Motta |
| 7,308,904 B2 | * | 12/2007 | Bria et al. ................ 137/311 |
| 2007/0221004 A1 | * | 9/2007 | Maeda ..................... 74/425 |

* cited by examiner

*Primary Examiner* — Lee D Wilson
*Assistant Examiner* — Henry Hong

(57) ABSTRACT

A device for polishing wheels of truck or cars without removing the valve or the tire of the wheel. The device comprises three parts: a rotative assembly fixed to a stand subject to an angular movement and housed upon a pendulum in extension. The rotative assembly includes a motor connected to a primary speed reducer 10:1 linked to a second speed reducer 60:1 fixed to a jaw turning at an average speed of 3 rpm, on which a wheel is positioned. The device is auto lubricating when a relative orientation of one reducer with respect to the other at 15° allows to maintain oil level in a critical reducer to prevent friction of mobile part inside the critical reducer. The pendulum possesses a pair of wheels to permit the displacement of the assembly on the ground while an actuator located on the pendulum causes the angular movement of the stand.

6 Claims, 5 Drawing Sheets

WHEEL POLISHING ROTARY STAND

PRIOR ART

The present invention refers to a provisional application by the same inventor <<Wheel stand>> U.S. 61/213,298 filed on May 27, 2009.

Our research among patents revealed some assemblies that caught our attention:

U.S. Pat. No. 4,723,377 <<Assembly for cleaning drums>> Assembly which positions drums of wheels at 45° to clean them.

U.S. Pat. No. 2,728,236 <<Wheel spinning machine>> provides a friction drum and a solenoid to provide mechanical contact with a wheel.

U.S. Pat. No. 6,957,999 <<Vehicle wheel rim polisher>> Used for large quantities of wheels. A polishing head is moving around a surface of a wheel.

BACKGROUND OF THE INVENTION

The present invention relates to a device for cleaning and polishing wheels of trucks or cars. The device turns a wheel slowly enough to permit its manual polishing without removing the valve and tire of the wheel.

OBJECTIVES AND ADVANTAGES

There is a need in the market and more precisely for small garages for an assembly which provides cleaning and manual polishing of a wheel without removing the valve or the tire of the wheel. The assembly is used for one wheel at a time and can be driven very easily from one place to another by means of its adjustable wheels, thus allowing the user to work close to the vehicle being polished, and it will also make the repair and welding operations more manageable. This assembly is designed to simplify the standing and polishing of alloy wheels of all dimensions.

The polishing is done first by positioning a wheel on a jaw fixed on a stand tilted at approximately 20°, the stand is sitting on a pendulum which maintains in balance on the ground the whole assembly. The jaw will fit any truck wheel (or car wheel). Its diameter helps position the wheel in a secure and effortless manner. Its extensive adaptability also allows the user to work at the right height. Then the wheel is turned while an operator uses a tool to polish metallic parts of the wheel.

The rotation speed is produced by a bidirectional rotary DC motor and two speed reducers, one of 10:1 and another of 60:1. The DC motor is turning at 1750 rpm; there is a first reducer of 10:1 which reduces the speed to 180 rpm and the second reducer of about 60:1 which reduces the speed to approximately 3 rpm. Then a portable grindstone can touch all the harshness of the metallic parts of the wheel. A variable speed control box is used to choose a convenient speed of wheel rotation between 1 to 10 rpm.

If reducers were not be tilted to about 15°, it would result in lack of oil and the premature wear of the gearings of the critical reducers. It is thus necessary to preinstall the critical reducer at 15° in order to keep oil level after the ideal position of the polishing is established. The critical reducer is the smaller one connected directly to the motor; the other is bigger and its moving parts are always buried in oil and therefore not as critical. With its bidirectional rotary motor and its variable speed control box, this invention will produce a professional and prime quality polish appearance. The assembly comes with a solid portable aluminum storage box to store the polishing and sanding appliances and products.

SUMMARY OF THE INVENTION

An assembly used to polish and clean wheels of truck or car comprising three parts: a rotative assembly placed on a support plate. A stand fixed on a pendulum and supporting the plate and giving it an angular movement. The rotative assembly comprises an electric motor of 1750 to 1800 rpm; this motor is linked to a primary reducer 10:1 which reduces the speed to 180 rpm; the primary reducer is linked to a second reducer 60:1 which reduces the speed to 3 rpm. The second reducer turns a jaw on which a wheel will be positioned. Between the two reducers a coupling plate is placed which positions the reducers at 15° one against the other for maintaining the oil level inside the primary reducer at a sufficient level for continuously lubricating the internal parts. We install a coupling plate between both reducers to help the more critical reducer maintaining its oil level after the ideal position of a polishing stand has been established by an operator. If the primary reducer were not tilted at 15°, it would cause a lack of oil and the premature wear of its internal parts.

At rest, the jaw is at 5° to facilitate the installation of a wheel. On work an operator will action a control box which activates the actuator so that the jaw be at a desired height, comfortable for the operator to use a portable angle grinder or buffer or sander polisher on the metallic parts of the wheel without hurting his back.

The present invention will be further understood from the following description with reference to the drawings.

BRIEF DESCRIPTION OF DRAWING FIGURES

DETAILED DESCRIPTION OF THE PREFERRED EMBODIMENTS

In the following description and in the accompanying drawings, the numeral numbers refer to identical parts in the various Figures.

Figure 1:
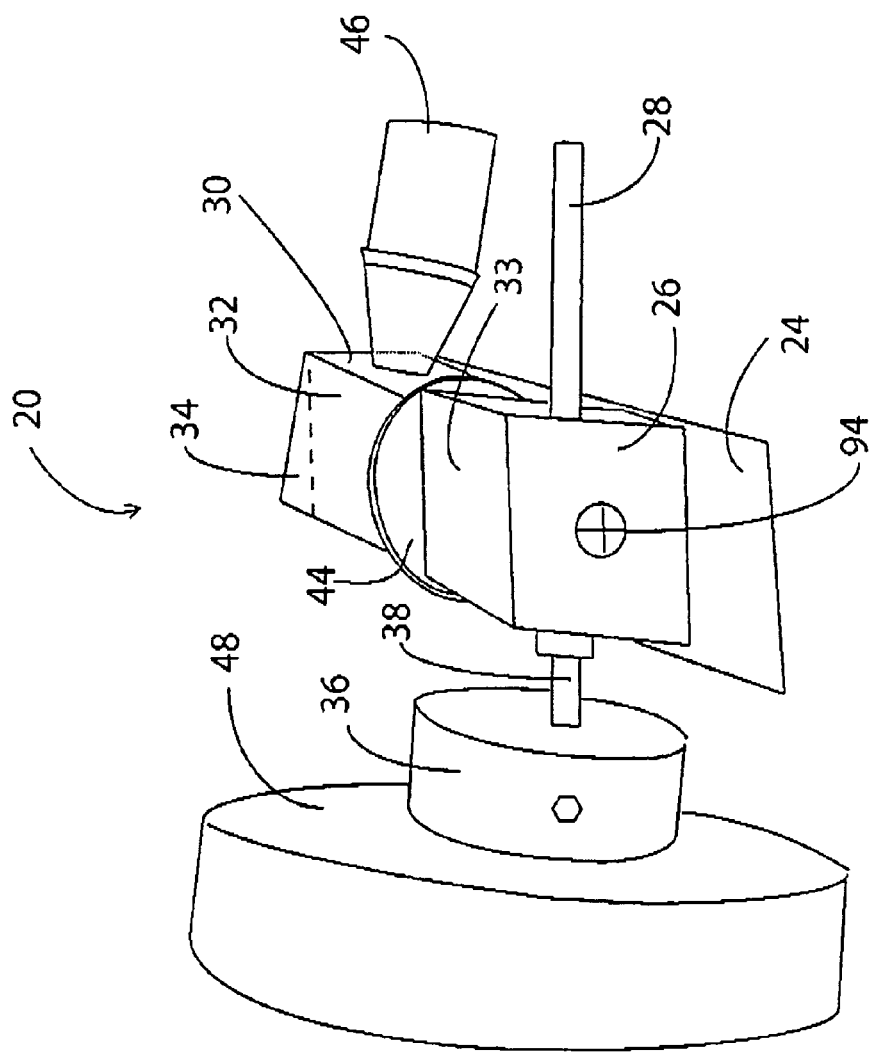
FIG. 1 is a schematic plan of a rotative assembly.

FIG. 1 shows a rotative assembly 20 intended to be fixed on a stand. A support plate 24 of the stand serves as support for two linked boxes of reducers a gearing reducer 60:1 26 driving a chuck with jaws 36. A drive-shaft 28 is for adjusting and sliding the chuck, and a primary reducer 10:1 30 driven by an electric motor 46 and having a superior face 32. The gearing reducer 26 has a top face 33.

There is an angle 34 between both faces, which can typically vary between 5 and 35 degrees.

The chuck is having iron jaw 36 with three bits to hold the heart of the wheel. The bits may be extended for catching european alloy wheels.

An extension 38 of the drive-shaft 28 holds the jaw at a certain distance to permit the polishing of the outside of a wheel.

A coupling plate 44 maintains respectively the orientation of the two top faces 32 and 33 at a predetermined angle 34. The favorite choice is 15 degrees. One can see a wheel 48 in position to be polished. An axial center 94 of the two reducers is shown.

Figure 2:
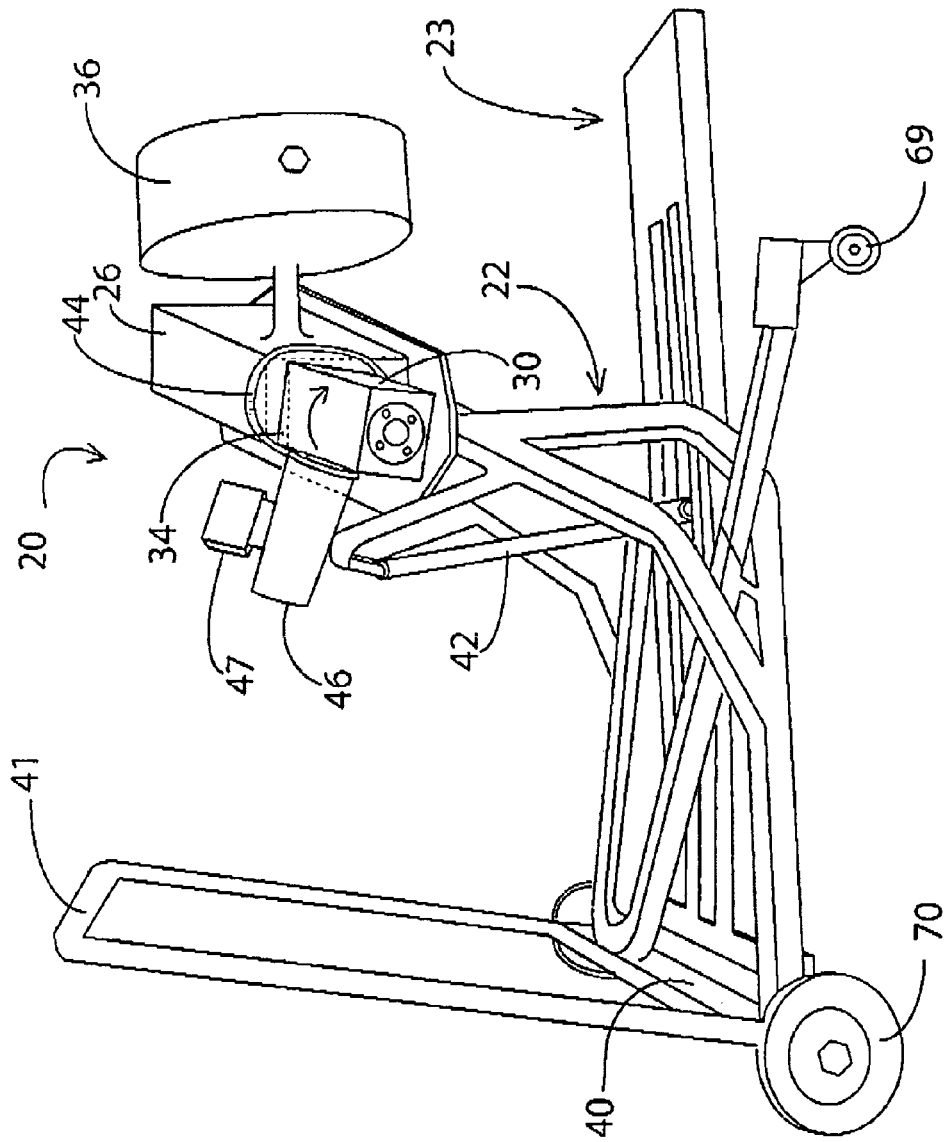
FIG. 2 is a schematic plan of a support for the assembly of FIG. 1.

FIG. 2 shows the rotative assembly 20 mounted on a stand 22 of angular movement mounted on an pendulum 23 in extension. A linear actuator 42 is fixed between the stand and the pendulum allowing an angular movement of the stand and a vertical movement of the plate 24. On a counterweight 40 at one end of the pendulum, a handle 41 for driving the whole assembly is welded. A pair of large wheels 70 and of small wheels 69 which are extendable 68 are part of the stand 22. A motor 46 is topped by a converter 47 which produces the DC current for speed control and is connected to the primary reducer 30; the second reducer 26 is connected to the jaw 36 which is to receive a wheel to be polished. The primary reducer 30 is shown here tilted 34 with respect to the second reducer 26 in an opposite direction (shown by an arrow) than in FIG. 1, thus allowing to put the motor 46 on the stand. One sees the coupling plate 44 between the two reducers.

Figure 3:
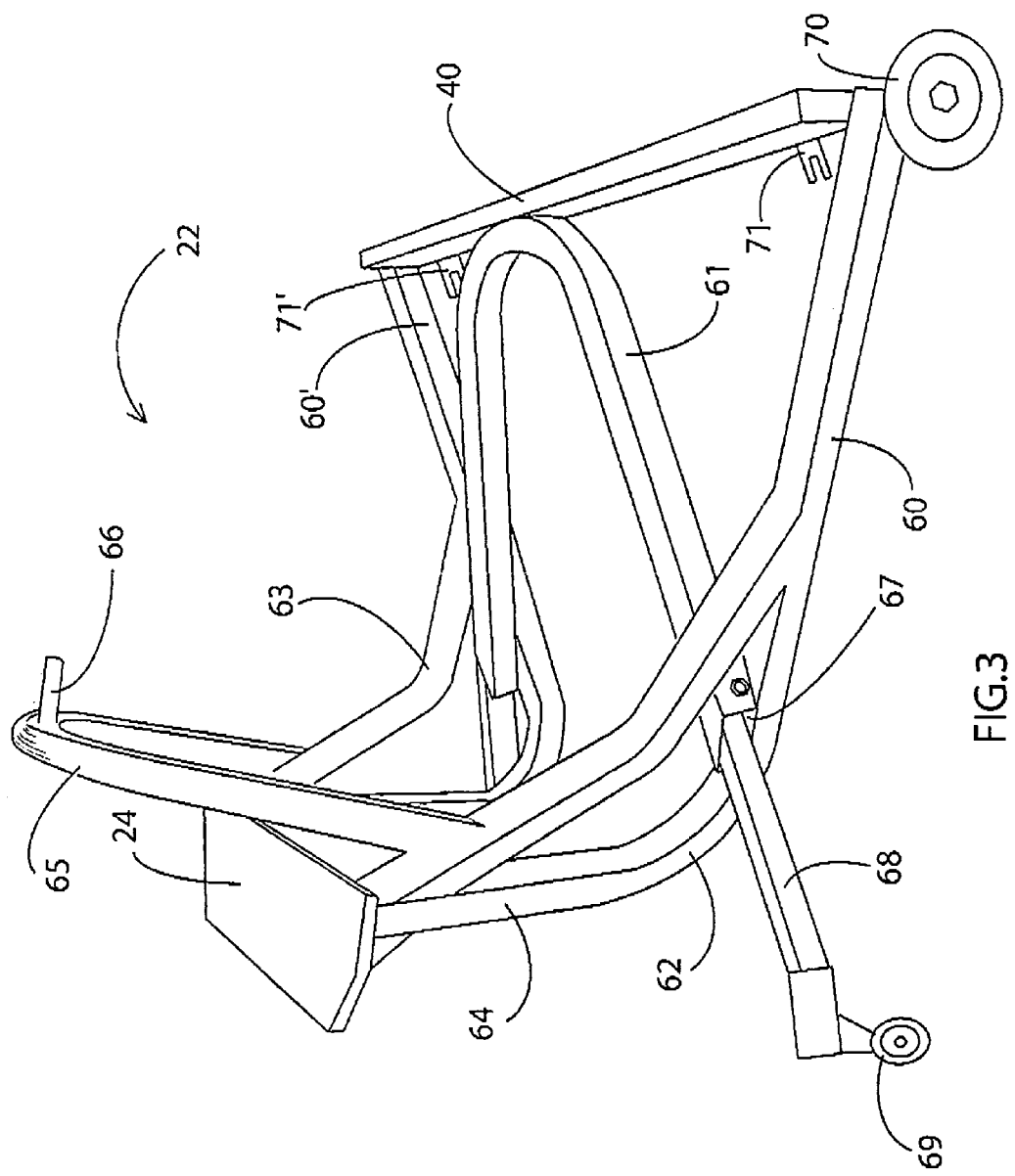
FIG. 3 is a perspective of a stand with angular movement.

FIG. 3 shows the stand 22 comprising two horizontal legs 60 and 60' linked by the horizontal counterweight 40 which has hinges 71, 71' and large wheels 70 at one end and a folded knee 62 at the other end, the folded knee continuing vertically into a top part for supporting the plate 24 of the rotative assembly. The stand comprises oblique reinforcements 63, 63', an arch 65 and a V-shaped support 61 positioned horizontally on the legs 60, 60' and in a forward direction. The V-shaped support is opened at the ends 67 and shows in extension an insert 68 with a small extendable wheel 69. One can see on the arch 65 a tip 66 to fix a linear actuator thereto.

Figure 4:
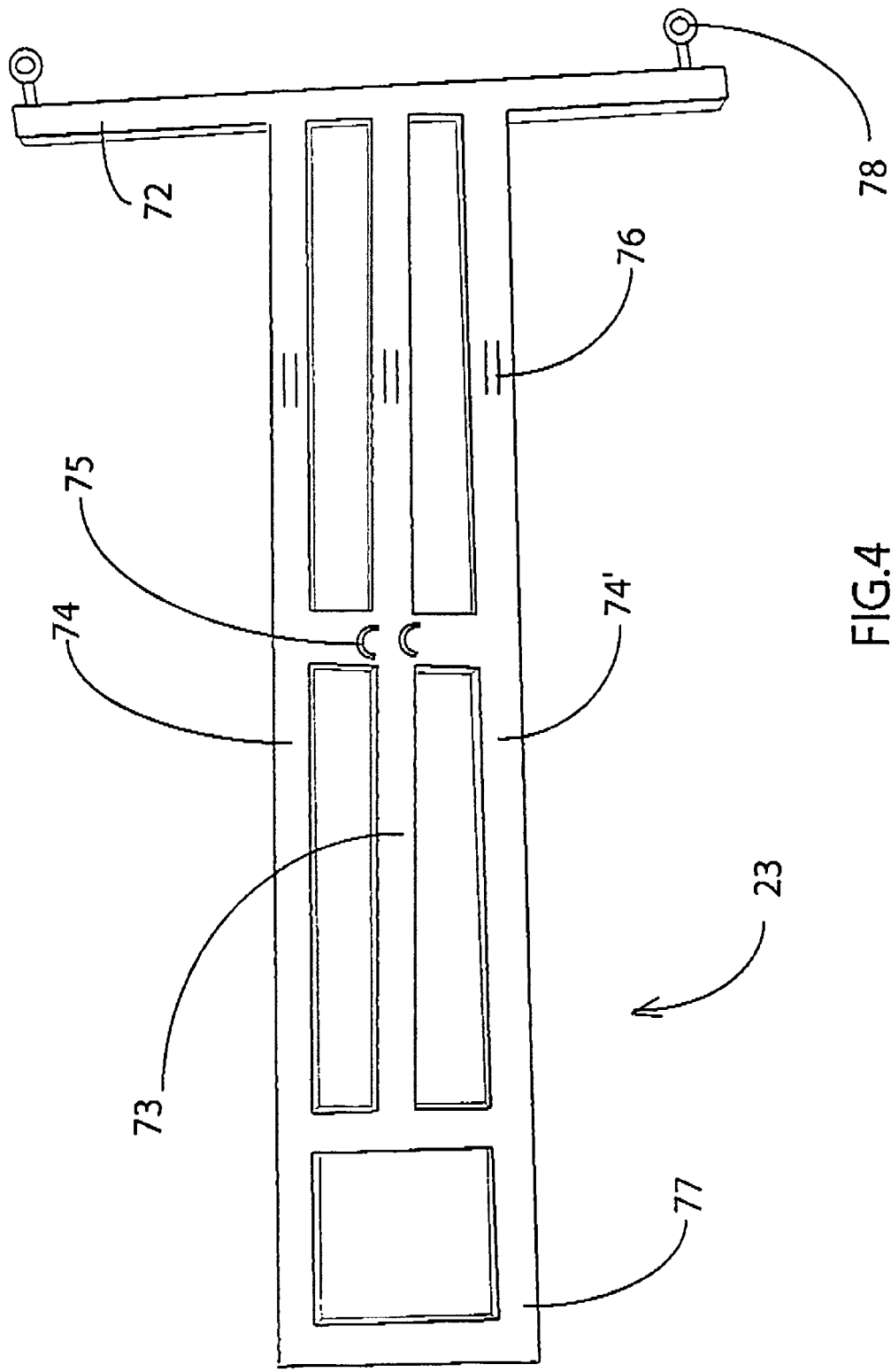
FIG. 4 is a perspective of a pendulum in extension.

FIG. 4 shows a pendulum 23 having a T-shape with a crossbar 72, two parallel longitudinal bars 74 and 74', an internal longitudinal bar 73 including in its middle a support point 75 to fix the linear actuator 42 (FIG. 2). Each longitudinal bar comprises a fold 76 at an angle of 5 degrees approximately and which allows a flat resting against the ground, continuous up to the fold, starting from an extension 77, and while the large wheels 70 (FIG. 2) are touching the ground. Rod ends 78 allow the pivoting of the stand 22 about the pendulum 23.

Figure 5:
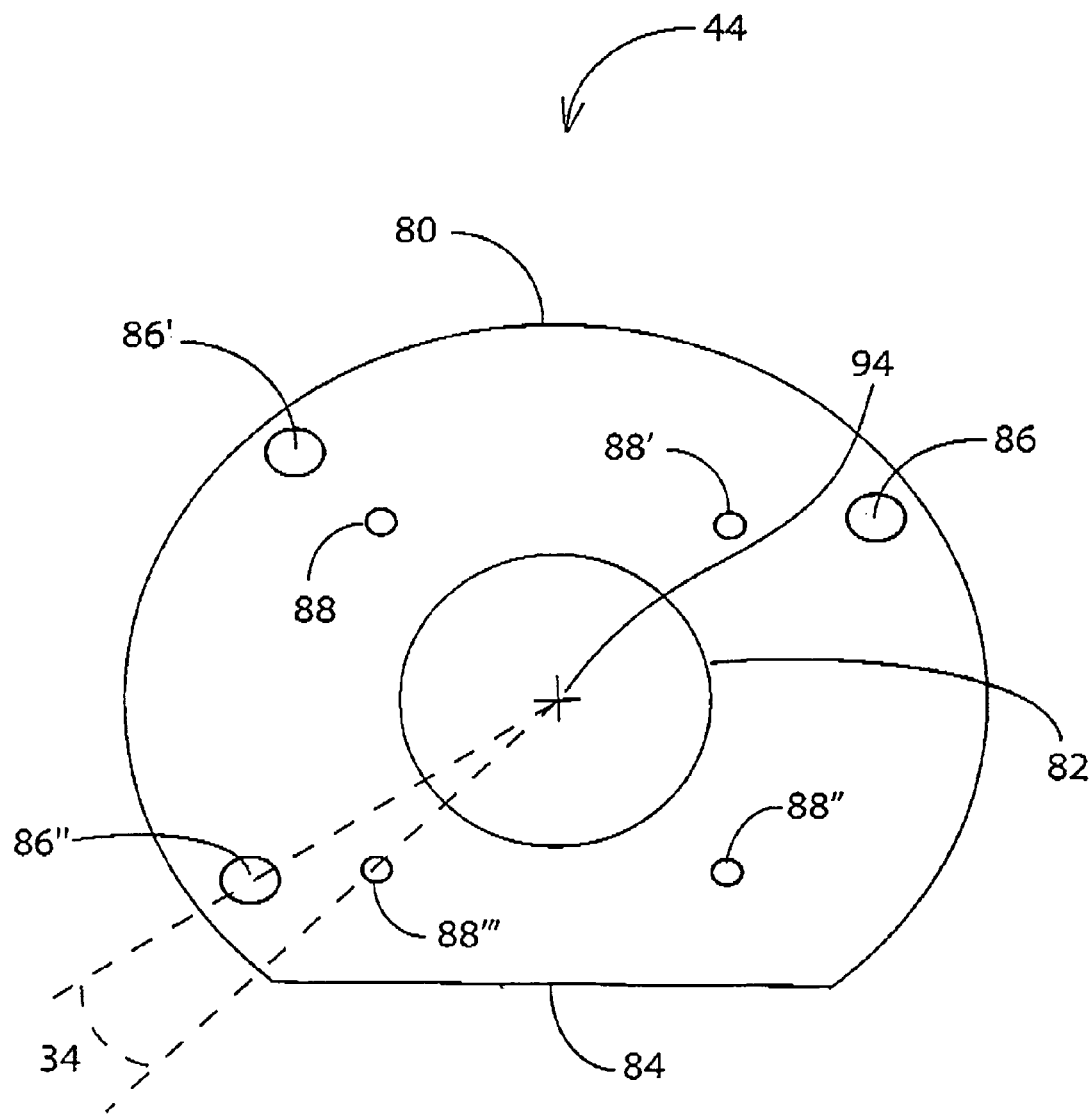
FIG. 5 is a face view of a coupling disk.

FIG. 5 shows a coupling plate 44 of a typical exterior diameter 80, like 6$^{1/2}$ inches, and a typical interior diameter 82, like 1$^{3/4}$ inches; the coupling plate is placed between the primary reducer 10:1 30 and the gear reducer 60:1 26. The primary reducer 10:1 is linked by a first group of bolts 88,88', 88'',88''' whereas the reducer 60:1 is linked by a second group of bolts 86, 86' and 86''. The first and the second groups of bolts are positioned relative one to the other by the angle 34. There are only three bolts of the reducer 60:1, which leaves a cut part 84 in the coupling plate 44 to limit the interference of the coupling plate over the support plate 24. An axial center 94 of both reducers coincides with an axial center of the coupling plate.

When the primary reducers is moved by the angle 34 with respect to the other, the oil inside continues to bathe the mobile parts and so reduces the friction during the rotating operation of polishing.

It is to be clearly understood that the instant description with reference to the annexed drawing is made in an indicative manner and that the preferred embodiments described herein are meant in no way to limit further embodiments realizable within the scope of the invention. The matter which is claimed as being inventive and new is limited only by the following claims.

PARTS

20 Rotative assembly
22 Stand
23 Pendulum in extension
24 Support plate
26 Gear reducer 60:1
28 Drive shaft
30 Primary reducer 10:1
32 Top face of 30
33 Top face of 26
34 Angle
36 Jaw
38 Extension of drive shaft 28
40 Counterweight
41 Handle for driving
42 Linear actuator
43 Piston of the actuator
44 Coupling plate
46 Motor
47 Converter DC-AC
48 Wheel
60, 60' Legs of the stand 22
61 V-shaped support
62 Knee
63, 63' Oblique reinforcements
64 Top part
65 Arch
66 Tip
67 Opened ends of the 61
68 Insert
69, 69' Small wheels
70 Large wheels
71, 71' Hinges
72 Crossbar
73 Internal longitudinal bar
74, 74' Longitudinal bars
75 Fixed point of the actuator
76 Fold
77 Extension
78 Rod end
80 Typical exterior diameter
82 Typical interior diameter
84 Cut part of coupling plate 44
86,86',86'' Bolts of reducer 60:1
88,88',88'',88''' Bolts of the reducer 10:1
94 Axial center of the reducers

I claim:

1. A device for polishing a wheel, said device comprising a rotative assembly (20) and support means therefor, said rotative assembly (20) comprising a combination of an electric motor (46) having a rotational speed of 1800 rpm with two reducers for reducing the rotation speed thereof, a primary reducer (30) of a ratio of 10:1 and a gear reducer (26) of a ratio of 60:1, said reducers being connected through a coupling plate (44), said coupling plate having an axial center (94) coinciding with a common axial center of said two reducers;

said gear reducer comprising a drive-shaft (28) powering a wheel holding jaw (36);

said coupling plate (44) comprising means of bolts to fix said two reducers to said coupling plate, said primary reducer positioned relative to said gear reducer by an angle (34), thus maintaining a top face of said primary reducer at said angle (34) relative to a top face of said gear reducer, thereby maintaining a level of oil allowing the lubrication of the internal parts of said primary reducer thus rendering said device auto lubricating;

said angle (34) being 15°±3°;

wherein said support means is a stand (22) comprising a support plate (24) to support said rotative assembly and an angular folded knee member (62), said stand being mounted on a pendulum (23) for maintaining it in balance upon a floor and said plate obliquely with respect to said floor, a linear actuator (42) positioned between said stand and said pendulum and causing an angular positioning of said knee member, said stand (22) comprising two horizontal legs (60, 60') with an elbow (62) and a top part (64) supporting said support plate (24), on said legs a V-shaped support (61) comprising at its ends openings (67) to insert small wheels (69, 69') to move said assembly, said top part including an arch (65) with a tip (66) to attach thereto said means of positioning.

2. The device of claim 1 wherein said gear reducer turning said drive-shaft and said jaw (36) wherein a wheel is positioned to be polished.

3. The device of claim 1 wherein rod ends (78) are installed on crossbar (72) of said pendulum (23) to allow the pivoting of said strand (22) on said pendulum (23).

4. The device of claim 1 wherein said jaws (36) are from a chuck for metal lathe.

5. The device of claim 3 wherein said crossbar (72) coincides with a counterweight (40).

6. The device of claim 1 wherein said means of bolts comprise a first group of bolt (88-88''') attaching said primary reducer to said coupling plate, and a second group of bolts (86-86''') attaching said gear reducer to said coupling plate, said first group of bolts is positioned relative to said second group of bolts by said angle (34), thereby maintaining said primary reducer at said angle (34) relative to said gear reducer, thus maintaining a level of oil allowing the lubrication of the internal parts of said primary reducer.

\* \* \* \* \*